United States Patent [19]

Mollod

[11] 3,816,831

[45] June 11, 1974

[54] NOISE-DITHERED HARD-LIMIT LORAN C/D RECEIVER

[75] Inventor: Leonard D. Mollod, Kinnelon, N.J.

[73] Assignee: International Telephone and Telegraph Corporation, Nutley, N.J.

[22] Filed: Oct. 24, 1972

[21] Appl. No.: 300,069

[52] U.S. Cl. ............................................... 343/103
[51] Int. Cl. ............................................. G01s 1/20
[58] Field of Search .................................. 343/103

[56] References Cited
UNITED STATES PATENTS 3,714,656  1/1973  Meranda ........................... 343/103

Primary Examiner—Malcolm F. Hubler
Assistant Examiner—Richard E. Berger
Attorney, Agent, or Firm—John I. O'Halloran; Menotti J. Lombardi, Jr.; Vincent Ingrassia

[57] ABSTRACT

This invention relates to a method of processing Loran signals using hard-limit techniques while overcoming interference problems usually associated with hard-limit processing. RF noise is added to the input signal to maintain a signal-to-noise ratio equal to ½. This restores the output signal linearity. A closed loop implementation is employed to control the amount of noise added to the input signal whereby the desired signal-to-noise ratio is maintained.

5 Claims, 2 Drawing Figures

PATENTED JUN 11 1974 3,816,831
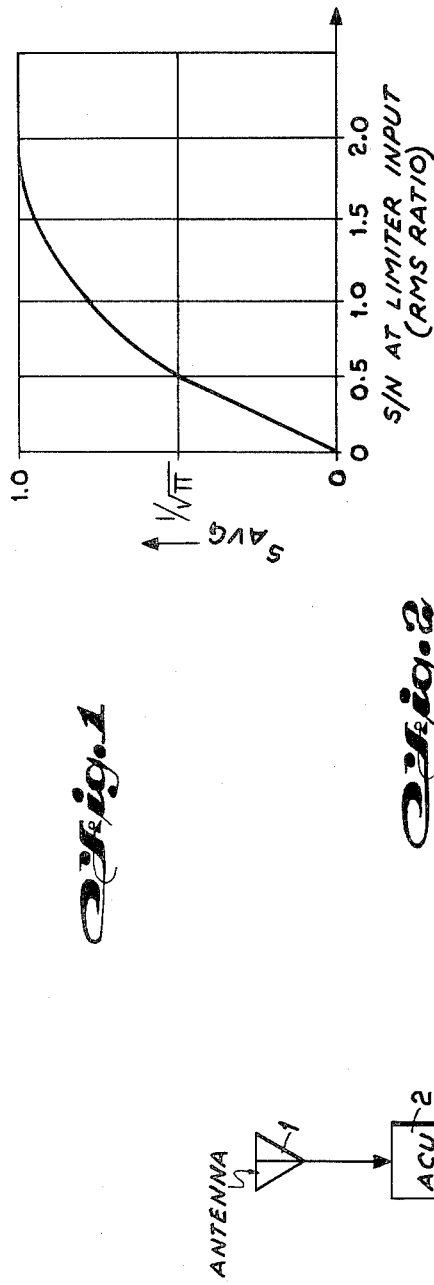
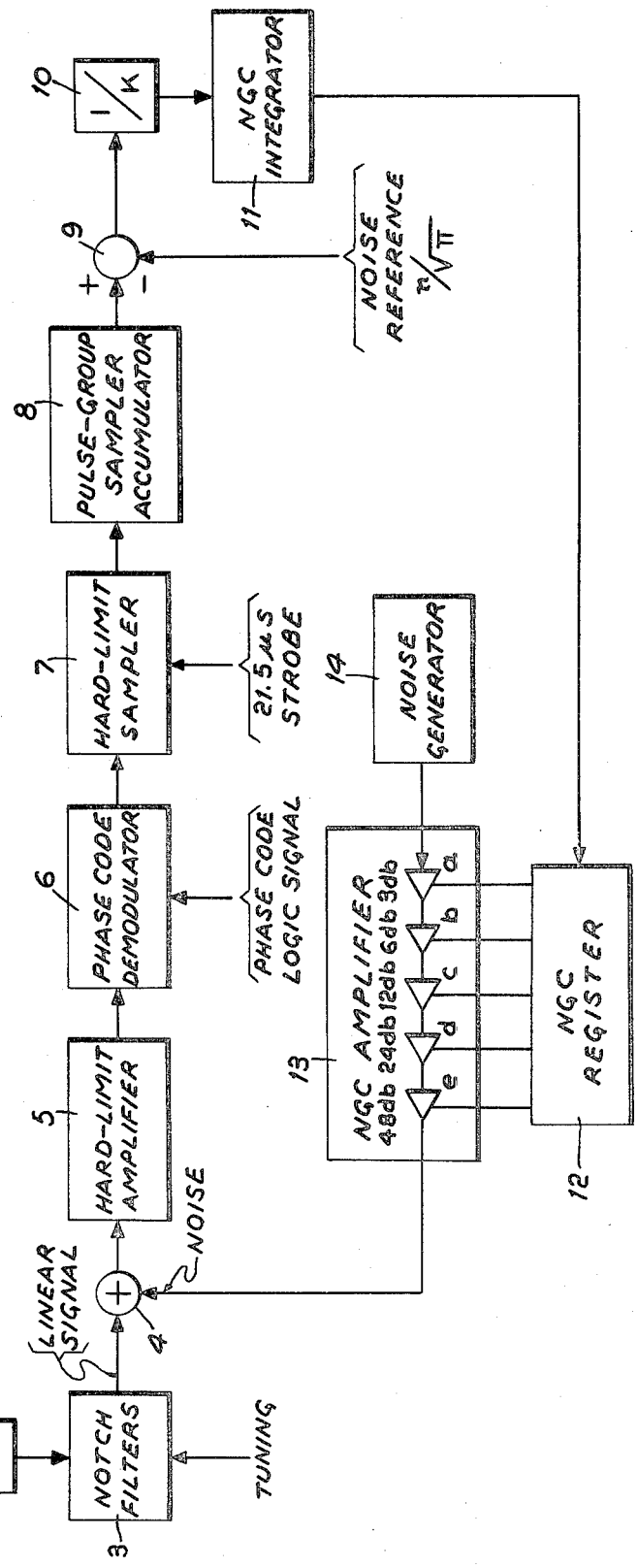

NOISE-DITHERED HARD-LIMIT LORAN C/D RECEIVER

BACKGROUND OF THE INVENTION

This invention relates to a digital sample data system of the type used in radio navigation systems such as Loran, and more particularly to a noise dithered LORAN C/D receiver.

Hard-limit signal processing is a technique wherein the signal of interest is amplified and clipped until it has theoretically zero rise time transitions between positive and negative states. These signal states are high and low or 1 and 0 logic levels, and therefore the signal information may be extracted by using standard digital logic circuits. Before the use of hard-limiting, the signal was constrained to remain linear and the extraction of signal information involved the use of analog circuitry rather than logic circuitry.

In a navigation system such as LORAN C/D, samples of the phase of the radio frequency signals provide information as to a receiver's position. Unfortunately, these signals are often contaminated by atmospheric noise, RF interference, and multi-hop skywave.

A recent article, "Interference Vulnerability of Phase-Lock Loops With Amplitude Limiting and Sampling," by R. Frank and R. Nick, 1969 EASCON Record, has demonstrated that hard-limited sampled-data tracking loops have spurious response to interference which is "synchronous" or "subsynchronous" to the sampling rate, or to multi-hop skywaves. These spurious responses allow generation of errors in the hard-limit tracking receiver when receiving these forms of interference. The same interference input has no error effect on a linear or amplitude sampling receiver.

The use of a hard-limit receiver would have an economic advantage over that of a linear receiver if the problem of errors caused by interference could be surmounted.

SUMMARY OF THE INVENTION

It is an object of the present invention to provide a method of hard-limit signal processing in a LORAN C/D receiver for tracking phase and envelope information while overcoming the above described interference problems.

According to a broad aspect of the invention there is provided an improved method of processing RF signals of the type used in Loran navigation systems wherein pulses in pulse groups are received on a 100 KHz carrier and wherein there is performed an envelope measurement and a cycle reading for determining the time difference between pulsed signals from a master transmitting station and a slave transmitting station comprising receiving said RF signal, combining internally generated RF noise with said RF signal, amplifying the combined signal in a hard-limit amplifier to form substantially zero transition times between positive and negative states, sampling each of said pulses at a predetermined time from the beginning of each said pulse resulting in a statistical signal average $S_{AV} = (2/\sqrt{\pi})(S/N)$ per pulse wherein $(S/N)$ is the signal-to-noise ratio, accumulating said samples over a group of n pulses, subtracting said accumulated signal from a predetermined noise reference corresponding to $(n/2) (2/\sqrt{\pi})(S/N)$ resulting in a difference signal corresponding to a noise gain error signal, smoothing said noise gain error signal, continuously integrating the smoothed error signal and controlling the amount of RF noise combined with said RF signal to drive said noise gain error signal to zero using said integrated signal.

It is a feature of the present invention that when sampling the hard-limited sum of signal plus noise, the signal linearity is statistically restored and the spurious responses eliminated. Linearity is closely achieved when the rms value of injected noise is at least twice that of signal. Therefore, the injected noise will cause a fluctuation on the phase measurement which must be filtered after sampling to within acceptable accuracy limits. If the post-detection filtering can be made suitably narrowband, the fluctuation error due to injected noise will be tolerable and the system is usable. The minimum tracking bandwidth is dependent on the necessary transient response of the tracking loop. In many instances, the combination of transient requirements and system accuracy can be accomodated. Although the invention employs a linear gain controlled amplifier to set the proper level of injected noise, the circuitry is relatively trivial since no phase shift requirements are imposed. Also, the noise dithered receiver does not require separate envelope deriver circuitry and an envelope hard-limit amplifier normally used in other hard-limit receivers.

The decrease in cost due to the elimination of the hard-limit amplifier and the envelope deriver circuitry overshadows the increase in cost due to the use of the noise gain control amplifier.

The above and other objects and other features of the present invention will be better understood from the following detailed description taken in conjunction with the accompanying drawings, in which:

BRIEF DESCRIPTION OF THE DRAWINGS

FIG. 1 is a graph illustrating the relationship between the statistical signal average and the input signal-to-noise ratio; and FIG. 2 is a functional block diagram of one embodiment which employs the inventive signal processing method.

DESCRIPTION OF THE PREFERRED EMBODIMENT

First, the statistical signal average variation as a function of root-mean-square (RMS) signal-to-noise (S/N), where the noise is Gaussian, will be derived. Then the operation of a LORAN C/D receiver employing noise dithering will be explained.

A theoretical limiter produces an output having only high or low levels with zero rise time transitions. At any point on the output waveform there exists a statistical signal average related to input signal-to-noise ratio. This average signal output is proportional to the percentage of time that noise does not override signal with opposite polarity. The amplitude probability distribution of the input noise can be used to calculate the signal average. The instantaneous noise $\eta$ does not change the signal polarity when:

$$\eta < S\sqrt{2} \quad \text{S in RMS volts}$$
$$\eta \text{ in volts (representing instantaneous noise level)} \quad (1)$$

The probability or percentage of time that Gaussian noise satisfies the above criterion is given by the area under the Gaussian probability density curve from:

$$-\infty \text{ to } \frac{S\sqrt{2}}{N}$$

which can be expressed as:

$$P = 1/2 \, erf\left(\frac{S}{N}\right) + 1/2 \quad (2)$$

where the erf (S/N) represents the area under the Gaussian density curve from $-(S\sqrt{2}/N)$ to $+(S\sqrt{2}/N)$ and is defined by:

$$erf(X) = \frac{2}{\sqrt{\pi}} \int_0^x \epsilon^{-y^2} dy \quad (3)$$

$$erf(X) = \frac{2}{\sqrt{\pi}} \left[ X - \frac{X^3}{3.1!} + \frac{X^5}{5.2!} - \ldots \right] \quad (4)$$

For a fraction of time P the signal polarity captures the limiter output and the signal integration increases, while for a fraction of time 1−P the noise causes a reverse polarity and signal integration decreases. The average signal is then:

$$S_{AVG} = P - (1-P) = 2P - 1 \quad (5)$$

$$S_{AVG} = erf(S/N) \quad (6)$$

$$S_{AVG} = \frac{2}{\sqrt{\pi}} \left[ (S/N) - \frac{(S/N)^3}{3.1!} + \frac{(S/N)^5}{5.2!} - \ldots \right] \quad (7)$$

$$S_{AVG} = \frac{2}{\sqrt{\pi}} \left(\frac{S}{N}\right) \frac{S}{N} << 1 \quad (8)$$

$S_{AVG}$ can be read directly from the tables of the Probability Integral in Pierce's Tables which can be found in "Short Table of Integrals" Fourth Edition by Pierce and Foster, Ginn & Company, 1956, by entering with a value of X equal to the RMS signal-to-noise ratio.

Equation (6) is shown in FIG. 1. From FIG. 1 and equation (7) it is evident that the limiter output is approximately linear with the S/N ratio for S/N<0.5. Below this point, the average signal is approximately equal to $(2/\sqrt{\pi})(S/N)$. Obviously, a plot of the S/N ratio looks precisely the same as the signal except for the noise scale factor. Thus, the linear signal has been statistically recreated at the limiter output for S/N<0.5. The dithering action of the noise has restored the signal linearity. This concept forms the basis for the inventive signal processing approach which utilizes the hardware simplicity inherent in hard-limiting approaches while yielding linear-like operations under CW interference, and skywaves.

The inventive method will now be explained with reference to FIG. 2. After linear filtering of the input signal, received by antenna 1, by antenna coupling unit 2 and notch filters 3, the proper amount of noise is added to the still linear signal, via RF summing circuit 4, to attain a signal-to-noise ratio of ½. For input S/N ratios less than ½, no noise is actually added. The noise-dithered signal is then hard-limited and ready for phase decoding and sampling at logic levels.

After the linear input signal combined with noise is amplified in hard-limit amplifier 5, the resulting signal undergoes phase code demodulation in demodulator 6, which is simply the selection of hard-limit RF or its inverse. The selection is determined by the level of a phase code logic signal applied to demodulator 6. The output of demodulator 6 is sampled, in hard-limit sampler 7, at 27.5 μsec from the beginning of the LORAN pulse. The output signal of sampler 7 averages to $S_{AV} = 2/\sqrt{\pi}(S/N)$ according to equation (8). The output of sampler 7 is accumulated in pulse-group sample accumulator 8 over a period of n pulses, where n equals eight for LORAN C and sixteen for LORAN D. The output $(n \cdot S_{AV})$ of accumulator 8 is subtracted, in subtractor 9, from a noise reference number $(n/\sqrt{\pi})$. The resulting difference signal is smoothed in divide circuit 10 and then integrated in noise-gain-control digital integrator 11. The scaling divide factor K sets the time constant of the averaging process to K LORAN periods.

If the signal-to-noise ratio is greater than the desired value of one half, then $n \cdot S_{AV}$ will be greater than $n/\sqrt{\pi}$, and the noise gain error will be positive, and a 1/K fraction of the error will be added to digital integrator 11. The output of integrator 11 is a binary noise gain control word (for instance 5 bits) which is applied to noise gain control amplifier 13 via noise gain control register 12. The output of noise generator 14 is applied to the input of noise gain control amplifier 13.

Noise gain control amplifier 13 is shown as consisting of five series connected binary weighted amplifiers. The gain control lines a, b, c, d and e correspond to the five output lines of register 12 and to the 5-bit noise gain control (NGC) word. The input of the 3db amplifier receives the output of noise generator 14. If, for example, the NGC word was 10101, a gain of 63db would result. If the NGC word was 11111, a gain of 93db would result.

The output of NGC amplifier 13 forms the noise input to RF summing circuit 4. The noise gain will contine to increase until the noise gain error signal is driven substantially to zero.

Two phase tracking loops per station group can be provided in the LORAN receiver. One is the normal phase lock loop on the uncontaminated groundwave. The second is an independent phase lock loop which tracks the groundwave peak and any skywave signal which may be present. Although this second peak tracking loop is not an essential part of this invention, it is one method of easing the dynamic requirements of the noise-dithered tracking loop and allows an increase in smoothing to reduce the error due to the injected noise. External velocity aid to the noise-dithered tracking loop would be another such method.

The phase of the LORAN pulse can be tracked by taking a polarity sample of the RF crossover. On a statistical basis, the phase error detector will have a sinusoidal transfer function as in a linear detector. Typical Type I or Type II servo loops can be used after error detection.

Envelope error detection is accomplished by an algorithm which ratios the E2 and E1 samples at 22.5 μsec and 27.5 μsec on the LORAN pulse. These two sampling times correspond to peaks of the 100 KHz carrier, 2.5 μsec on either side of the phase crossover. Due to the noise dithering, the average values of the E1 and E2 samples will form the ratio found on a linearly processed pulse. This E2/E1 ratio varies over the leading edge of the LORAN pulse to enable location of the proper envelope sampling point. An error function is produced that is similar to the conventional derived envelope waveform generated by delay and add or envelope deriver circuitry.

It is to be understood that the foregoing description of specific examples of this invention is made by way of example only and is not to be considered as a limitation on its scope.

I claim:

1. An improved method of processing RF signals of the type used in Loran navigation systems wherein pulses in pulse groups are received on a 100KHz carrier and wherein there is performed an envelope measurement and a cycle reading for determining the time difference between pulsed signals from a master transmitting station and a slave transmitting station comprising:

receiving said RF signal;

combining internally generated RF noise with said RF signal;

amplifying the combined signal in a hard-limit amplifier to form substantially zero transistion times between positive and negative states;

sampling the output of said hard-limit amplifier at a predetermined time from the beginning of each pulse resulting in a statistical signal average $S_{AV} = (2/\sqrt{\pi})(S/N)$ wherein (S/N) is the signal-to-noise ratio;

accumulating said samples over a group of n pulses;

subtracting said accumulated signal from a predetermined noise reference corresponding to $(n/2)(2/27\pi)(S/N)$ resulting in a difference signal corresponding to a noise gain error signal;

smoothing said noise gain error signal;

continuously integrating the smooth error signal; and controlling the amount of RF noise combined with said RF signal to drive said noise gain error signal to zero using said integrated signal.

2. A method according to claim 1 wherein said signal-to-noise ratio is $\leq \frac{1}{2}$.

3. A method according to claim 1 wherein $n = 8$.

4. A method according to claim 1 wherein $n = 16$.

5. A method according to claim 1 wherein said error signal is a 5 bit binary word which varies the gain of said RF noise.

* * * * *